(12) United States Patent
Montero et al.

(10) Patent No.: US 12,079,846 B2
(45) Date of Patent: Sep. 3, 2024

(54) ASSISTANCE WITH SELF-CHECKOUT SYSTEM

(71) Applicant: Toshiba Global Commerce Solutions Holdings Corporation, Tokyo (JP)

(72) Inventors: Linda R. Montero, Durham, NC (US); Janaia Brundidge, Durham, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 88 days.

(21) Appl. No.: 17/239,321

(22) Filed: Apr. 23, 2021

(65) Prior Publication Data

US 2022/0343374 A1 Oct. 27, 2022

(51) Int. Cl.
*G06Q 30/02* (2023.01)
*G06Q 20/20* (2012.01)

(52) U.S. Cl.
CPC ....... *G06Q 30/0281* (2013.01); *G06Q 20/202* (2013.01); *G06Q 20/204* (2013.01); *G06Q 20/208* (2013.01)

(58) Field of Classification Search
CPC ............. G06Q 30/0281; G06Q 20/202; G06Q 20/204; G06Q 20/208
See application file for complete search history.

(56) References Cited

U.S. PATENT DOCUMENTS

| | | | |
|---|---|---|---|
| 6,497,362 B2 | 12/2002 | Persky et al. | |
| 8,259,925 B2 | 9/2012 | Smith et al. | |
| 10,043,168 B1 * | 8/2018 | Catoe | G06Q 20/18 |
| 2010/0158310 A1 * | 6/2010 | McQueen | A47F 9/046 |
| | | | 348/E5.022 |
| 2016/0196597 A1 * | 7/2016 | Allen | G06Q 30/0281 |
| | | | 705/26.41 |
| 2019/0051083 A1 * | 2/2019 | Goldberg | G07F 9/026 |
| 2019/0172041 A1 * | 6/2019 | Hill | G06Q 20/202 |
| 2019/0244214 A1 * | 8/2019 | Flores | G06Q 30/016 |

OTHER PUBLICATIONS

Collier et al., "Why the little things matter: Exploring situational influences on customers' self-service technology decisions," Journal of Business Research, vol. 68, pp. 703-710. (Year: 2015).*
Roggeveen et al., "Customer-Interfacing Retail Technologies in 2020 & Beyond: An Integrative Framework and Research Directions," Journal of Retailing, vol. 96, No. 3, pp. 299-309 (Year: 2020).*

* cited by examiner

*Primary Examiner* — Resha Desai
*Assistant Examiner* — Patrick Kim
(74) *Attorney, Agent, or Firm* — Patterson + Sheridan, LLP

(57) ABSTRACT

Aspects described herein include a computer-implemented method (and associated system and computer program product) for a self-checkout transaction by a user in an environment. The method includes receiving an assistance request to receive assistance from an associate. The assistance request is associated with one or more items that are available for selection in the environment. The method further includes displaying a wait time for the assistance request, and receiving, prior to elapse of the wait time, a user input indicating that the user declines to wait for the assistance. The method further includes generating, responsive to the user input, one or more control signals to operate one or more devices to specify a location within the environment. The method further includes displaying instructions that prompt the user to place the one or more items in the specified location.

15 Claims, 6 Drawing Sheets

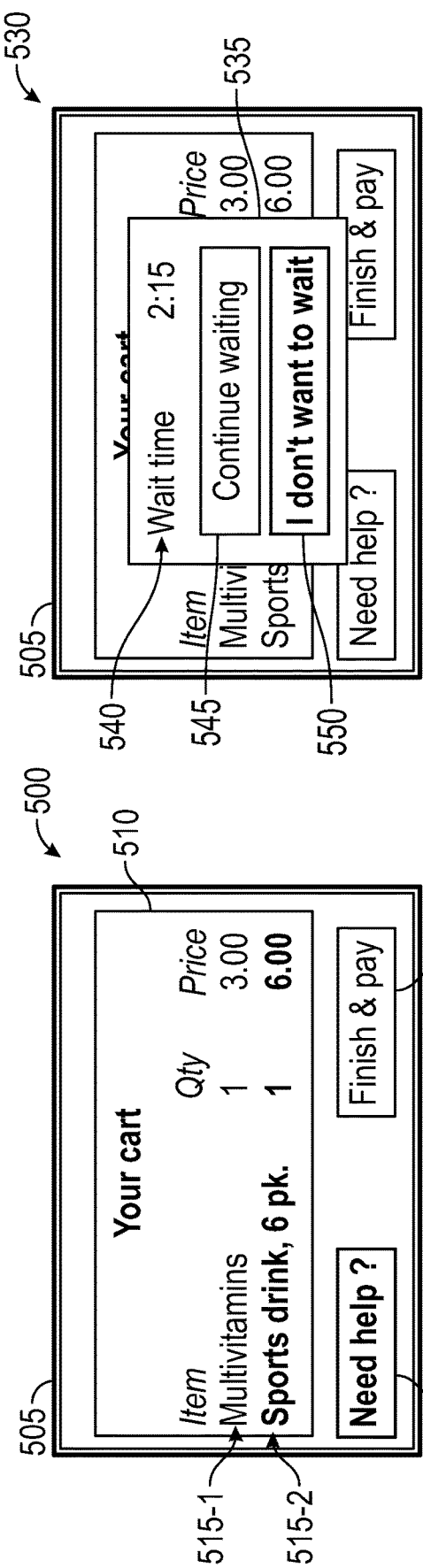

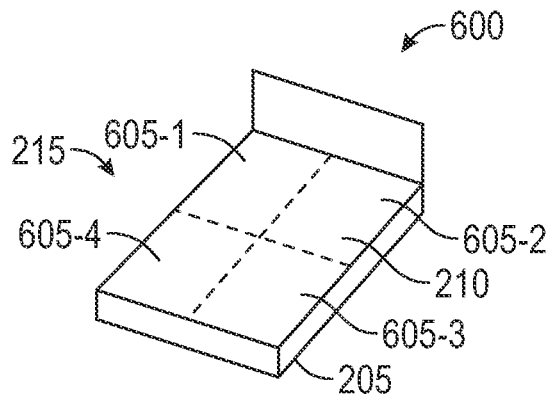
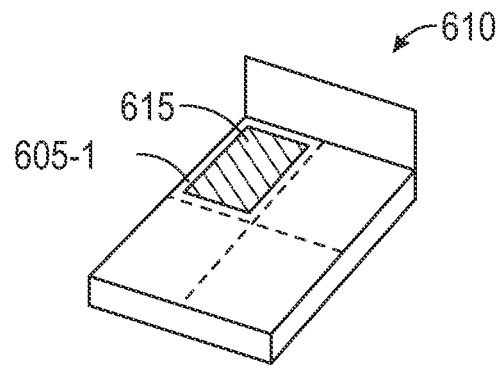
FIG. 6A　　　　　FIG. 6B
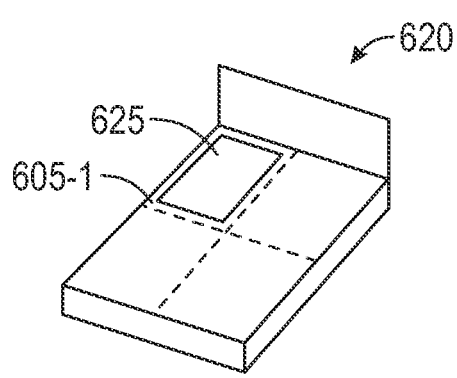
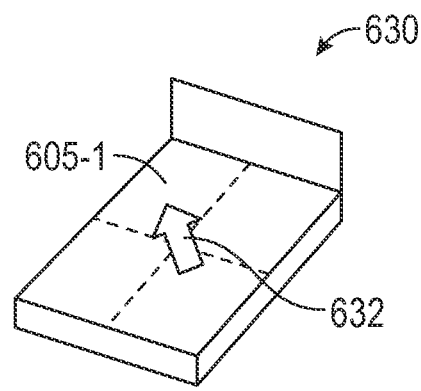
FIG. 6C　　　　　FIG. 6D
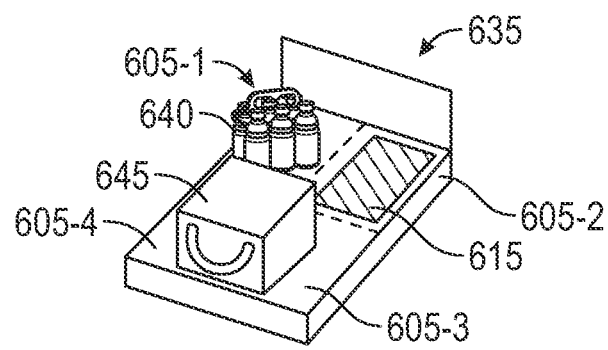
FIG. 6E

ASSISTANCE WITH SELF-CHECKOUT SYSTEM

BACKGROUND

The present disclosure relates to self-checkout systems, and more specifically, techniques supporting user flexibility when seeking associate assistance during a self-checkout transaction.

Self-checkout systems include diverse functionality that enables users (e.g., customers) to perform some or all of the stages of a self-checkout transaction, such as scanning items, weighing items, bagging items, presenting payment, and providing a paper or electronic receipt.

Users may seek assistance from an associate to complete aspects of the self-checkout transaction. Although a self-checkout terminal may display or otherwise indicate that associate assistance has been requested, the user is often uninformed about the expected wait time. As a result, the wait may exceed user expectations, causing frustration and the possibility of lost revenue should the user choose to abandon the self-checkout transaction.

SUMMARY

According to one embodiment, a computer-implemented method is disclosed for a self-checkout transaction by a user in an environment. The method comprises receiving an assistance request to receive assistance from an associate. The assistance request is associated with one or more items that are available for selection in the environment. The method further comprises displaying a wait time for the assistance request, and receiving, prior to elapse of the wait time, a user input indicating that the user declines to wait for the assistance. The method further comprises generating, responsive to the user input, one or more control signals to operate one or more visual indicator devices to specify a location within the environment. The method further comprises displaying instructions that prompt the user to place the one or more items in the specified location.

According to another embodiment, a system comprises a display, one or more visual indicator devices operable to indicate locations within an environment to a user, an input device, and one or more computer processors configured to perform an operation for a self-checkout transaction. The operation comprises receiving an assistance request to receive assistance from an associate. The assistance request is associated with one or more items that are available for selection in the environment. The operation further comprises displaying, using the display, a wait time for the assistance request, and receiving, using the input device and prior to elapse of the wait time, a user input indicating that a user declines to wait for the assistance. The operation further comprises generating, responsive to the user input, one or more control signals to operate the one or more visual indicator devices to specify a location, and displaying, using the display and responsive to the user input, instructions that prompt the user to place the one or more items in the specified location.

According to another embodiment, a computer program product comprises a computer-readable medium having computer-readable program code embodied therewith. The computer-readable program code is executable by one or more computer processors to perform an operation for a self-checkout transaction. The operation comprises receiving, from a user, an assistance request to receive assistance from an associate. The assistance request is associated with one or more items that are available for selection in an environment. The operation further comprises displaying, using a display communicatively coupled with the one or more computer processors, a wait time for the assistance request. The operation further comprises, prior to elapse of the wait time, receiving, using an input device communicatively coupled with the one or more computer processors, a user input indicating that the user declines to wait for the assistance. The operation further comprises generating, responsive to the user input, one or more control signals to operate one or more visual indicator devices to specify a location within the environment. The operation further comprises displaying, using the display and responsive to the user input, instructions that prompt the user to place the one or more items in a specified location.

BRIEF DESCRIPTION OF THE SEVERAL VIEWS OF THE DRAWINGS

So that the manner in which the above recited aspects are attained and can be understood in detail, a more particular description of embodiments of the disclosure, briefly summarized above, may be had by reference to the appended drawings. It is to be noted, however, that the appended drawings illustrate only typical embodiments of the disclosure and are therefore not to be considered limiting of its scope, for the disclosure may admit to other equally effective embodiments.

FIGS. 5A-5D illustrate a sequence of graphical user interface (GUI) sequence during a self-checkout transaction, according to one or more embodiments.

FIG. 6A-6E illustrate specifying a location using an attachable platform, according to one or more embodiments.

DETAILED DESCRIPTION

Aspects of the current disclosure relate to a method of performing a self-checkout transaction by a user in an environment. The method includes receiving an assistance request to receive assistance from an associate, where the assistance request is associated with one or more items that are available for selection. The method further includes displaying a wait time for the assistance request, and receiving, prior to elapse of the wait time, a user input indicating that the user declines to wait for the assistance. The method further includes generating, responsive to the user input, one or more control signals to operate one or more visual indicator devices to specify a location within the environment. The method further includes displaying instructions that prompt the user to place the one or more items in the specified location.

The method may be performed using computing hardware of a self-checkout terminal. In other cases, the method may be performed using other computing hardware, such as a separate computing device in the environment. For example, some or all of the self-checkout transaction may be performed using a mobile computing device belonging to the user (e.g., a smartphone or a body-worn device).

In some embodiments, the location specified by the self-checkout system includes a portion of a self-checkout terminal, which may include dedicated or shared structures. In some embodiments, the self-checkout terminal may use a number of visual indicator devices to dynamically assign the portion. In some embodiments, the specified location includes a secure region for placing restricted or other sensitive items. In some embodiments, the specified location may convey the items away from the self-checkout terminal using passive (e.g., a chute) and/or active (e.g., a conveyor belt) techniques.

The self-checkout system receives one or more sensor signals that indicate whether the user has placed the item(s) in the specified location. In some embodiments, completion of the self-checkout transaction may be enabled when the item(s) are placed (e.g., setting or clearing a flag). If the item(s) are not placed, the self-checkout system may generate an alert or trigger an audit.

Beneficially, the self-checkout system may better set and manage user expectations by displaying (and updating) an estimated wait time for the associate assistance, and by providing the user the choice to wait or to proceed with the self-checkout transaction without the item(s).

While features of the self-checkout system are generally discussed within the context of a shopping environment, such as within a retail store, it is contemplated that the techniques disclosed herein may be applied to other environments (some non-limiting examples include libraries, museums, classrooms, hospitals, etc.).

Figure 1:
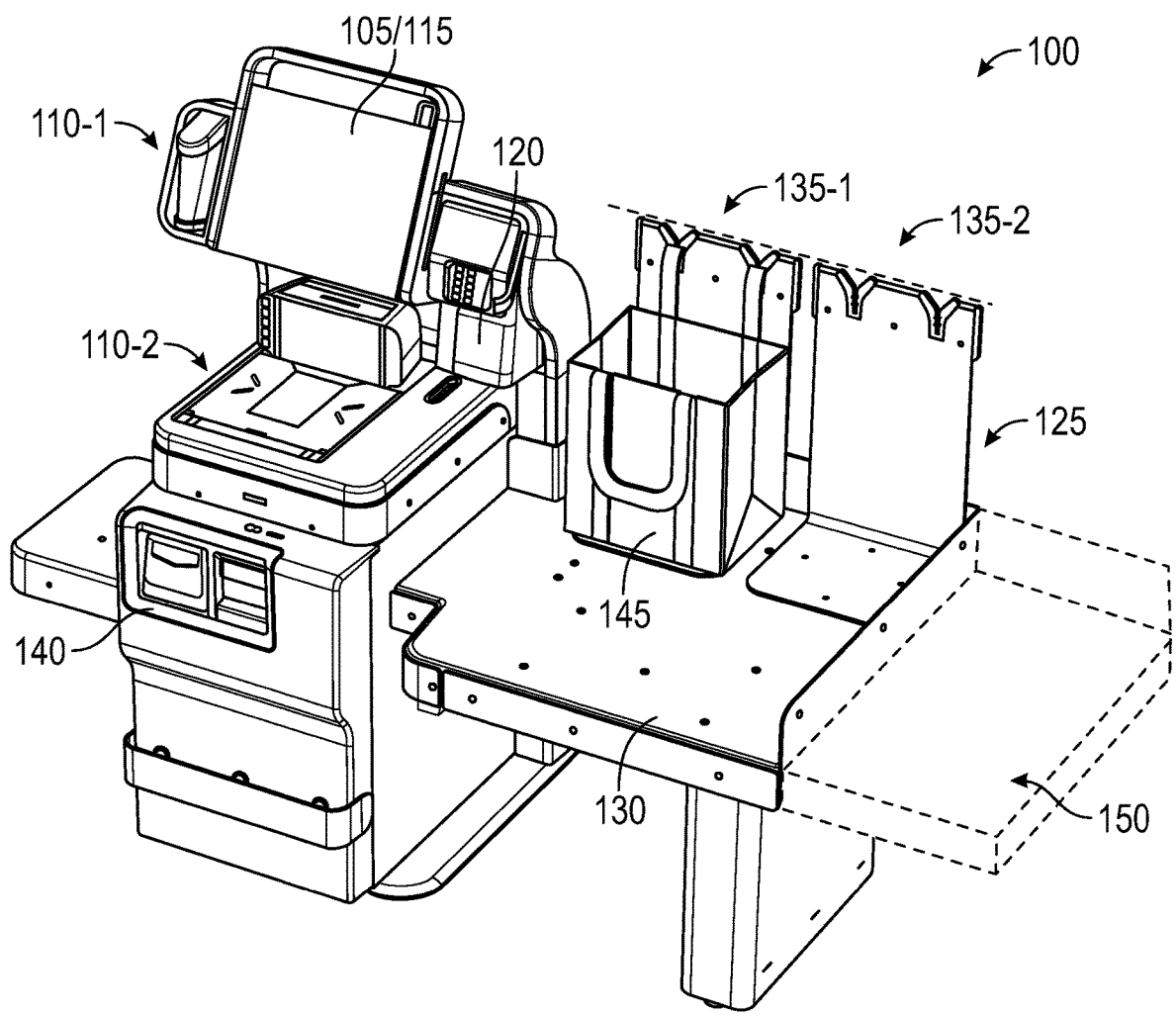
FIG. 1 illustrates an exemplary implementation of a self-checkout system, according to one or more embodiments.

FIG. 1 illustrates an exemplary implementation of a self-checkout system, according to one or more embodiments. The self-checkout system includes a self-checkout terminal 100 generally includes functionality that enables a user to perform some or all of the stages of a self-checkout transaction, such as scanning items, weighing items, bagging items, presenting payment, and providing a paper or electronic receipt.

The self-checkout terminal 100 comprises a display system 105 that presents information viewable by a user (e.g., a user or an associate) during various stages of a self-checkout transaction. The display system 105 is communicatively coupled with one or more computer processors, which may be integrated into the self-checkout terminal 100 or external to the self-checkout terminal 100. For example, the one or more computer processors may be included in a computing device integrated with the self-checkout terminal 100, which may be further networked with other computing devices. In some embodiments, the display system 105 comprises multiple, overlapping display screens using any suitable display technology or technologies, such as a liquid crystal display (LCD), an organic light-emitting diode (OLED) display, and so forth. In some embodiments, the display system 105 includes an input device 115 that receives inputs from the user during the self-checkout transaction. For example, the input device 115 may include a touch-sensitive screen using any suitable sensing technology, such as capacitive sensing, resistive sensing, and so forth.

The self-checkout terminal 100 further comprises one or more item scanners 110-1, 110-2 (collectively or generically, item scanner(s) 110). Each item scanner 110 is communicatively coupled with the one or more computer processors, and in conjunction with the one or more computer processors visually identifies items during scanning. For example, each item scanner 110 may detect encoded portions (e.g., a Universal Product Code (UPC) or a Quick Response (QR) code) and/or may compare imagery of the item with reference image(s) to identify a type of the item.

In some embodiments, the item scanner 110-1 comprises a handheld scanner that may be aimed by a user at items to scan the items, and the item scanner 110-2 is integrated into a surface of the self-checkout terminal 100. In some embodiments, the item scanner 110-2 further includes one or more load cells for measuring weights of items.

The self-checkout terminal 100 further comprises a payment receiver that may be fully or partly integrated into the display system 105. In some embodiments, the payment receiver is fully integrated into the display system 105 (e.g., using the input device 115). In other embodiments, the payment receiver is partly integrated into the display system 105. In one example, the touch input device may provide a pinpad for a credit card terminal that is external to the display system 105. In another example, the payment receiver may include a cash receiver in a forward panel 140 that is configured to receive banknotes and/or coins from a user as payment for the self-checkout transaction. In some cases, the cash receiver may be configured to dispense banknotes and/or coins to the user as change.

The self-checkout terminal 100 further comprises a printer 120 that prints or otherwise provides tangible item(s) to the user. The printer 120 is communicatively coupled with the one or more computer processors. In some embodiments, the printer 120 generates paper receipts for the self-checkout transaction and/or coupons.

The self-checkout terminal 100 further comprises a bagging area 125 comprising a plurality of bagging stations 135-1, 135-2 (collectively or generically, bagging station(s) 135). Each bagging station 135 includes structure suitable for dispensing, supporting, suspending, and/or retaining single-use shopping bags and/or reusable bags or totes. As shown, the bagging stations 135-1, 135-2 are disposed on a fixed platform 130, and the bagging station 135-1 is engaged with a handle of a reusable tote 145 to retain the reusable tote 145 on the fixed platform 130. Other configurations of the bagging area 125 are also contemplated, such as different numbers and/or arrangements of the bagging stations 135, a rotatable carousel, and so forth.

A user may transport one or more items to the self-checkout terminal 100 to initiate a self-checkout transaction. The user scans the item(s) using the item scanners 110-1, 110-2 and places the item(s) once scanned into the bagging area 125, e.g., into the reusable tote 145 or onto the fixed platform 130.

During the self-checkout transaction, the user may request assistance via inputs to the self-checkout terminal 100 (e.g., touch inputs to the input device 115). The self-checkout terminal 100 may estimate a wait time for the assistance request and display the wait time using the display system 105. When the user provides an input (e.g., using the input device 115) indicating that the user declines to wait for the assistance, the self-checkout terminal 100 displays instructions that prompt the user to place the item(s) in a specified location. By doing so, the user effectively removes the item(s) from the self-checkout transaction (e.g., removes the item(s) from a virtual cart associated with the self-checkout transaction).

In some embodiments, the specified location is within the self-checkout terminal 100. Some non-limiting examples of the specified location include a region of the fixed platform 130 or beneath the fixed platform 130 (e.g., on a shelf or on the floor).

In some embodiments, the specified location is external to the self-checkout terminal 100. Some non-limiting examples of the specified location include a region at or near the self-checkout terminal 100 (e.g., on the floor). In some embodiments, the specified location may be on an external structure 150 that is arranged at or near the self-checkout terminal 100. In one example, and as shown, the external structure 150 may be attached to the self-checkout terminal 100, e.g., using threaded fasteners.

Figure 2A:
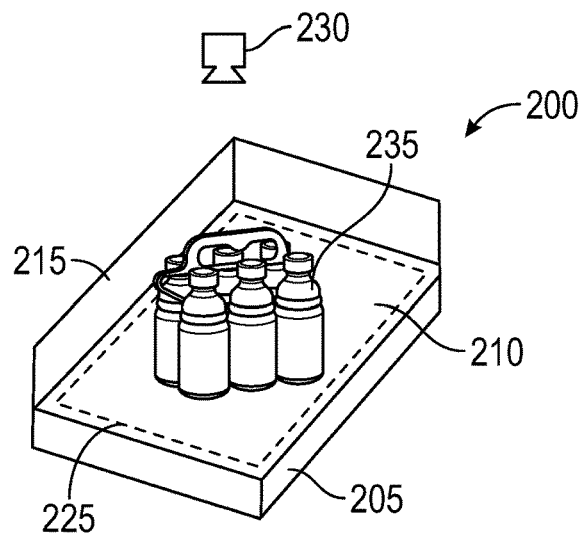
FIG. 2A illustrates a platform attachable to a self-checkout system, according to one or more embodiments.
Figure 2B:
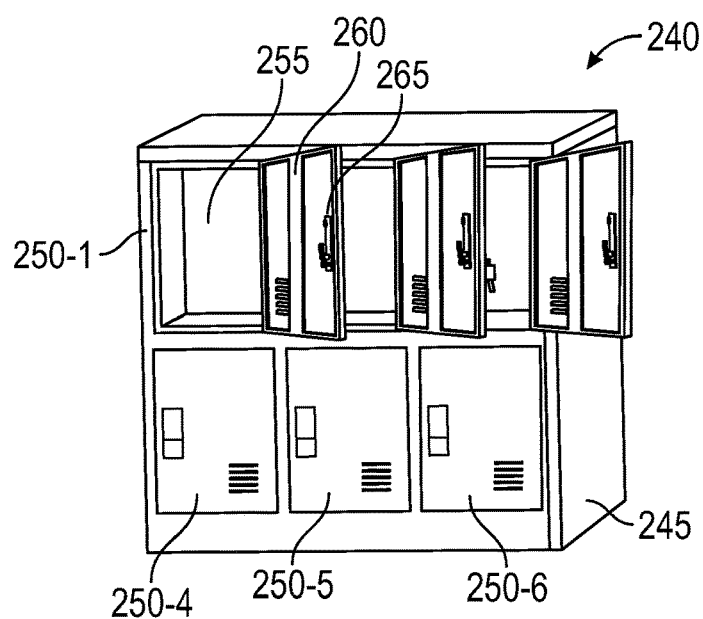
FIG. 2B illustrates a locker system for use with a self-checkout system, according to one or more embodiments.
Figure 2C:
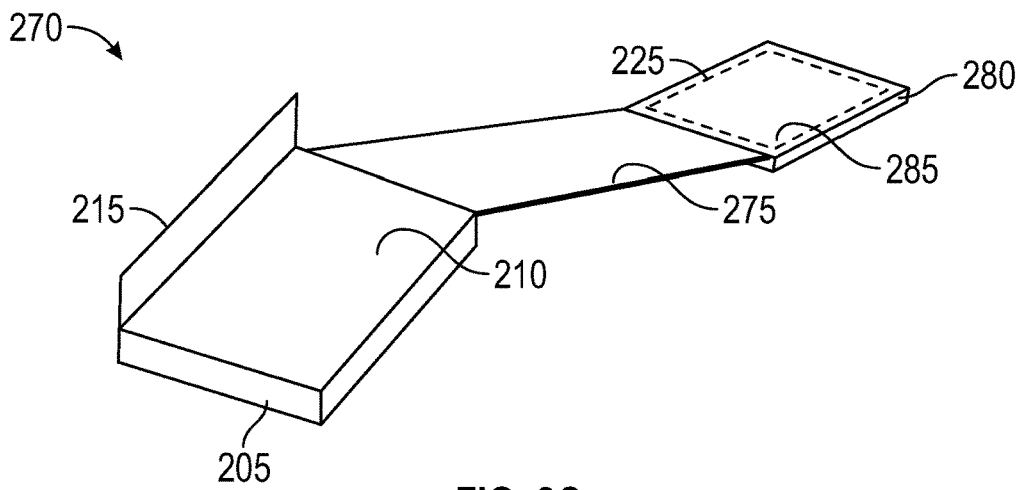
FIG. 2C illustrates a conveyor system for use with a self-checkout system, according to one or more embodiments.

Some non-limiting examples of the external structure 150 are provided in FIGS. 2A, 2B, and 2C. In FIG. 2A, diagram 200 illustrates a platform 205 that is attachable to the self-checkout terminal 100. In some embodiments, the platform 205 comprises a top surface 210 and an interface 215 that extends vertically from the top surface 210. The platform 205 may attach to the self-checkout system 100 through the interface 215, e.g., using threaded fasteners that extend through openings in the interface 215. In some cases, the interface 215 may serve as a divider that visually distinguishes the bagging area 125 of the self-checkout terminal 100.

In FIG. 2B, a locker system 240 may be arranged at or near the self-checkout terminal 100. The locker system 240 comprises six (6) lockers 250-1, . . . , 250-4, 250-5, 250-6 (collectively or generically, locker(s) 250) arranged in two (2) rows by three (3) columns. Different numbers and arrangements of the lockers 250 are also contemplated. Each locker 250 has an interior volume 255 defined by a portion of a frame 245 and a respective door 260. Operation of each door 260 is controlled by an access control device 265, such as an electronic lock system or latch system that receives signals from the self-checkout terminal 100 and that is operable to lock the door 260 to the frame 245 while the door 260 in a closed configuration, unlock the door 260 while the door 260 is in the closed configuration, open the door 260, and so forth. In some cases, the access control device 265 may also be manually operable by the user. For example, the access control device 265 may unlock the door 260, permitting the user to open the door 260 by manually unlatching the door 260 from the frame 245.

In FIG. 2C, a conveyor system 270 is configured to convey items away from the bagging area 125 of the self-checkout terminal 100. The conveyor system 270 comprises a transport surface 275 extending from the top surface 210 of the platform 205 to a top surface 285 of a receiver platform 280. Items may be placed on the top surface 210 and transported to, and stored at, the receiver platform 280. In some embodiments, the transport surface 275 comprises an active transport surface, such as a conveyor belt. In some embodiments, the transport surface 275 comprises a passive (e.g., gravity-assisted) transport surface, such as a slide. Combinations of the active transport surface and the passive transport surface are also contemplated. In some embodiments, the top surface 285 of the receiver platform 280 is at a lower height than the top surface 210. In other embodiments, the top surface 285 is at a same height as the top surface 210.

The one or more items may comprise a restricted item or other sensitive item. In an example commercial environment, some example categories of restricted items include high-value, easily concealable items, age-restricted items such as alcohol products, tobacco products, and adult-oriented products, and so forth. In other example environments, other criteria for access may be used to define categories of restricted items.

In some embodiments, the specified location for restricted item(s) may be a secure region to restrict access to the restricted item(s) by others until an associate can access and dispose of the restricted item(s). In one example, the interior volume 255 of each of the lockers 250 may represent a secure region that may be secured using the access control device 265. In another example, the receiver platform 280 may represent a secure region where the receiver platform 280 is positioned so as to be inaccessible by others.

Referring also to FIG. 1, and as discussed above, the self-checkout terminal 100 displays instructions that prompt the user to place item(s) in a specified location. In some embodiments, the self-checkout terminal 100 may display a textual and/or graphical depiction of the location using the display system 105.

In some embodiments, the self-checkout terminal 100 may transmit one or more control signals to operate one or more visual indicator devices to indicate the specified location to the user. In one example, the self-checkout terminal 100 may include one or more visual indicators (e.g., indicator lights) that are selectively illuminated by the one or more control signals to identify the specified location. For example, lights within the platform 130 may be controlled to outline the specified location, to form an arrow pointing toward the specified location, and so forth. In another example, the self-checkout terminal 100 may activate a conveyor belt (e.g., the transport surface 275). In yet another example, the self-checkout terminal 100 may operate the access control devices 265 of the locker system 240. In one embodiment, the doors 260 may have a normally closed configuration, and the control signal(s) may operate the access control device 265 to unlatch and/or open a selected door 260 to indicate the specified location to the user.

Turning now to FIGS. 6A-6E, the attachable platform 205 is used to illustrate specifying a location to the user. In diagram 600, the self-checkout terminal 100 divides the top surface 210 into a plurality of areas, and specifically, four (4) quadrants 605-1, 605-2, 605-3, 605-4. However, different numbers and/or arrangements of the areas are also contemplated. Further, in some embodiments, the areas may be dynamically assigned by the self-checkout terminal 100.

In diagram 610, the self-checkout terminal 100 specifies the quadrant 605-1 as the location and illuminates an area 615 of the quadrant 605-1. The area 615 may include a single illuminable element (e.g., a panel) or an array of illuminable elements at the quadrant 605-1. In some cases, one or more illuminable elements are shared with other quadrants 605-2, 605-3, 605-4. In diagram 620, the self-checkout terminal 100 illuminates a perimeter 625 that substantially outlines the quadrant 605-1. The perimeter 625 may include a single illuminable element or an array of illuminable elements at the quadrant 605-1. In diagram 630, the self-checkout terminal 100 illuminates illuminable element(s) in the shape of an arrow 632 pointing toward the quadrant 605-1.

The self-checkout terminal 100 may select the location using any suitable techniques. In some embodiments, the self-checkout terminal 100 user sensor signal(s) to determine whether the areas are unoccupied or otherwise available to place the item(s). For example, the self-checkout terminal 100 may select the quadrant 605-1 by default. However, as seen in diagram 635, sensor signal(s) may indicate that an item 640 is arranged within the quadrant 605-1, and that a reusable bag 645 is arranged within the quadrants 605-3, 605-4. In this case, the self-checkout terminal 100 may select the quadrant 605-2.

Returning to FIGS. 2A-2C, after specifying the location, the self-checkout terminal 100 may receive one or more sensor signals to sense whether the item(s) have been placed in the location. In some embodiments, the self-checkout terminal 100 includes a visual sensor 230, such as a camera having a field of the view that includes the location (e.g., an overhead visual sensor). One or more computer processors of, or external to, the self-checkout terminal 100 may perform image processing to identify the item(s). In some embodiments, the self-checkout terminal 100 includes a weight sensor 225 (e.g., one or more load cells) that is configured to weigh any item(s) placed on the top surface 210 of the platform 205.

The locker system 240 and the conveyor system 270 may also include the visual sensor 230 and/or the weight sensor 225. For example, each locker 250 of the locker system 240 may include a respective weight sensor 225, and the receiver platform 280 of the conveyor system 270 may include the weight sensor 225. Further, some embodiments may include both the visual sensor 230 and the weight sensor 225.

In some embodiments, the sensor signal(s) are processed by the computer processor(s) and compared against values from an item database to determine whether the item(s) have been placed in the location. For example, assume that the item to be placed in the location is a pack 235 of six (6) bottles of a sports drink. The sensor signals may be compared with reference values (e.g., images and/or weights) to determine whether any of the bottles are missing from the pack 235. Detecting missing bottle(s) may suggest theft or other loss. In some embodiments, a threshold value may be applied to account for "normal" variance in the items. For example, the user may wish to remove the pack 235 from the self-checkout transaction after noticing that a bottle was leaking, which causes the pack 235 to have a reduced weight. Assuming that the reduced weight falls within the threshold value (e.g., one-sixth of the weight) of the reference value for the weight of the pack 235, the self-checkout terminal 100 will deem the pack 235 to have been acceptably removed from the self-checkout transaction. In some embodiments, the self-checkout terminal 100 may apply one or more other criteria to determine whether item(s) have been acceptably removed from the self-checkout transaction, such as visually assessing whether the item(s) are unopened or undamaged.

In some embodiments, once the item(s) have been placed in the specified location (and in some cases, deemed to have been acceptably removed), the self-checkout terminal 100 may remove the item(s) from a virtual cart associated with the self-checkout transaction. In some embodiments, the self-checkout terminal 100 may enable completion of the self-checkout transaction, e.g., by setting or clearing a flag.

In some embodiments, the self-checkout terminal 100 may transmit one or more control signals once the item(s) have been placed in the specified location. In one example, the self-checkout terminal 100 may de-activate the conveyor belt. In another example, the self-checkout terminal 100 may operate the access control devices 265 of the locker system 240. In one embodiment, the control signal(s) may operate the access control device 265 to close and/or lock the door 260.

Although the functionality above is described as being performed by the self-checkout terminal 100, in alternate embodiments, another computing device may perform some or all of the functionality. For example, the user may provide inputs for the self-checkout transaction using their mobile computing device.

Figure 3:
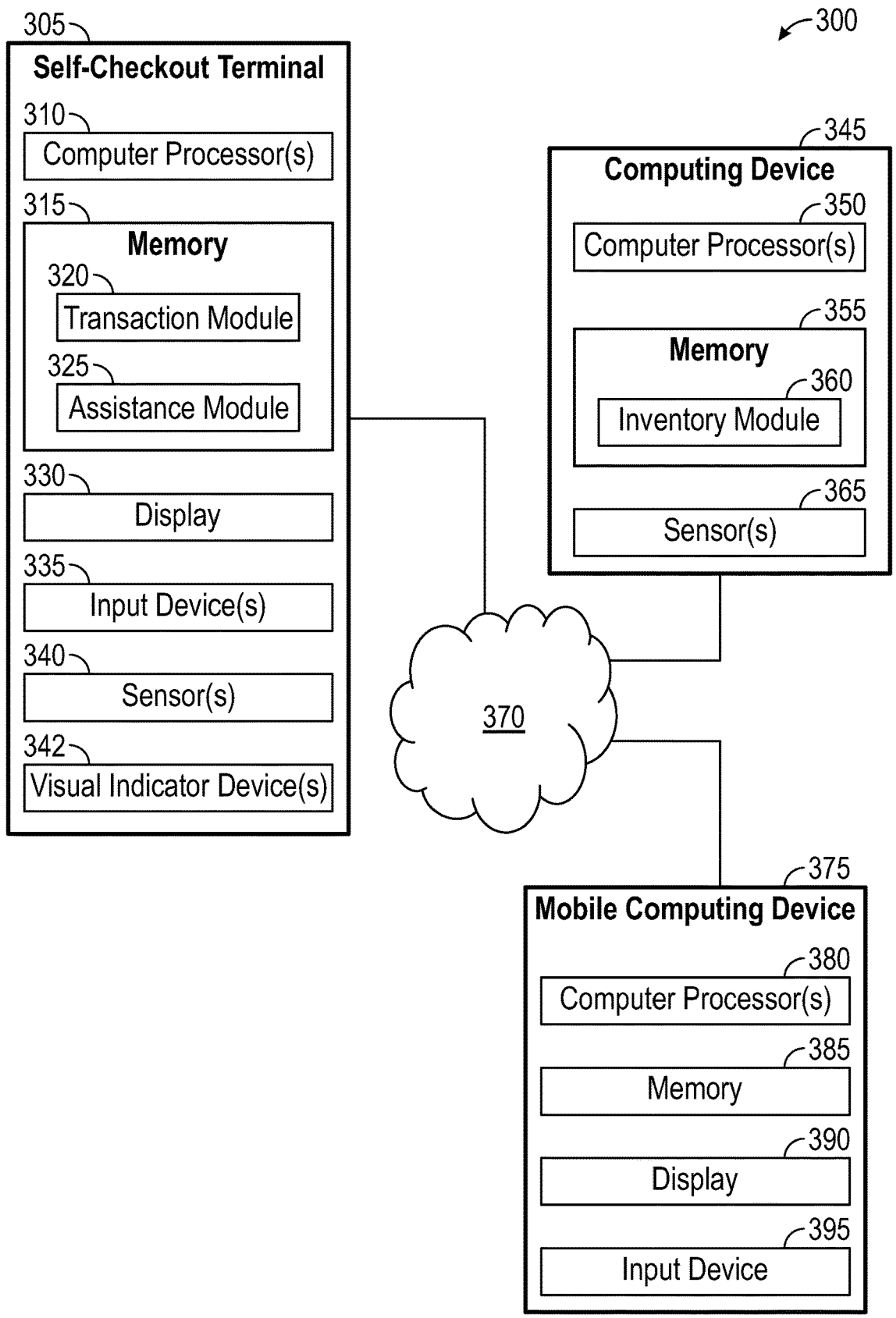
FIG. 3 is a system diagram for a self-checkout transaction, according to one or more embodiments.

FIG. 3 is a diagram of a system 300 for a self-checkout transaction, according to one or more embodiments. The features of the system 300 may be used in conjunction with other embodiments.

The system 300 comprises a self-checkout terminal 305 (one example implementation of the self-checkout terminal 100 of FIG. 1) that is communicatively coupled with a computing device 345 and a mobile computing device 375 via a network 370. The self-checkout terminal 305 comprises one or more computer processors 310, a memory 315, a display 330, one or more input devices 335, one or more sensors 340, and one or more visual indicator devices 342.

The one or more computer processors 310 may be implemented in any suitable form, such as a general purpose microprocessor, a controller, an application-specific integrated circuit (ASIC), and so forth. The memory 315 may include a variety of computer-readable media selected for their size, relative performance, or other capabilities: volatile and/or non-volatile media, removable and/or non-removable media, etc.

The display 330 may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology or technologies. In some embodiments, the display 330 represents one example of the display system 105 of FIG. 1.

The one or more input devices 335 receive inputs from a user during self-checkout transactions. The one or more input devices 335 may have any suitable implementations, such as the input device 115 (e.g., a touch-sensitive screen that may be integrated or overlaid with the display 330) and the item scanners 110-1, 110-2 of FIG. 1.

The network 370 represents one or more networks of any suitable types, such as the Internet, a local area network (LAN), a wide area network (WAN), and/or a wireless network. Each of the communicative links with the network 370 may have any suitable implementation, such as copper transmission cable(s), optical transmission fiber(s), wireless transmission, router(s), firewall(s), switch(es), gateway computer(s), and/or edge server(s).

The memory 315 may include one or more modules for performing various functions described herein. In one embodiment, each module includes program code that is executable by the one or more computer processors 310. In another embodiment, each module is partially or fully implemented in hardware (i.e., circuitry) or firmware of the self-checkout terminal 305 (e.g., as circuitry within the one or more computer processors 310). However, other embodiments of the system 300 may include modules that are partially or fully implemented in other hardware or firmware, such as hardware or firmware included in one or more other computing devices connected with the network 370, and so forth. Stated another way, the overall functionality of the one or more modules may be distributed among other devices of the system 300, such as the computing device 345 and/or the mobile computing device 375.

As shown, the memory 315 comprises a transaction module 320 and an assistance module 325. The transaction module 320 generally receives information related to the virtual cart (e.g., via the input device 335 or the network 370) and in some embodiments maintains or updates the virtual cart. For example, the transaction module 320 may access a current version of the virtual cart via the network 370, and may receive one or more inputs to update the virtual cart, e.g., by adding items scanned at the self-checkout terminal 305, removing selected items from the virtual cart, and so forth.

The assistance module 325 generally manages the fulfillment of assistance requests by users during self-checkout transactions. In some embodiments, each assistance request is associated with one or more items of the self-checkout transaction. In one example, the assistance request may correspond to a single item. In one embodiment, the single item may be indicated as the current or active item on the display 330 when the user submits the assistance request. In another example, the assistance request may correspond to multiple items of the self-checkout transaction (e.g., the entire self-checkout transaction).

In some embodiments, the assistance module 325 assigns each assistance request to be fulfilled by a particular associate based on any suitable factors, such as the availability of the associates, a number of assistance requests in the queue, a relative priority of the assistance requests, the relative experience levels of the associates, and so forth. In some embodiments, the assistance module 325 estimates a wait time for the assistance request, which may be displayed for the user using the display 330. The assistance module 325 may update the wait time based on an updated availability of the associates, e.g., as earlier assistance requests are completed.

In some embodiments, a user may decline to wait for the assistance by providing a user input, e.g., using the input device(s) 335. The assistance module 325 may cancel or deprioritize the assistance request responsive to the user input. For example, canceling the assistance request may remove the assistance request from the queue, and deprioritizing the assistance request may demote the assistance request within the queue.

The assistance module 325 determines the specified location for placing the item(s). In some embodiments, the specified location may be predefined (e.g., a dedicated region of the self-checkout terminal 305 (or of the external structure 150). In some embodiments, the self-checkout terminal 305 may use the one or more sensors 340 to determine an available region of the self-checkout terminal 305, such as a bagging station that is clear of items.

The assistance module 325 generates instructions that prompt the user to place the item(s) in the specified location, which may be displayed for the user using the display 330. The instructions may be provided in any suitable format, e.g., graphical and/or textual. In some embodiments, the assistance module 325 generates control signals to indicate the specified location, e.g., illuminating indicator light(s), activating a conveyor belt, or opening a locker door.

In some embodiments, the assistance module 325 generates one or more control signals to operate the one or more visual indicator devices 342 to specify the location within the environment. The visual indicator devices 342 may have any suitable implementations, e.g., LEDs arranged on or integrated with the platform. In some cases, the visual indicator devices 342 may be external to the platform, e.g., an overhead light that illuminates the location.

The one or more sensors 340 generate sensor signals that indicate whether item(s) have been placed by the user in the specified location. In some embodiments, the one or more sensor 340 comprises one or both of a weight sensor or a visual sensor.

Responsive to determining the item(s) have been placed in the specified location, the assistance module 325 may communicate with the transaction module 320 to remove the item(s) from a virtual cart associated with the self-checkout transaction. In some embodiments, the assistance module 325 may communicate with the transaction module 320 to enable completion of the self-checkout transaction, e.g., by setting or clearing a flag.

The computing device 345 comprises one or more computer processors 350, a memory 355, and one or more sensors 365. Generally, the computer processor(s) 350 may be configured similarly to the computer processor(s) 310, and the memory 355 may be configured similarly to the memory 315. In some embodiments, the computing device 345 may be associated with the environment, and comprises an inventory module 360 that maintains an inventory system for the environment. For example, the inventory module 360 may update inventory levels based on item(s) included in self-checkout transactions (e.g., managed by the transaction module 320). In some embodiments, the one or more sensors 365 may be used to maintain the inventory system. For example, the one or more sensors 365 may comprise visual sensors distributed through the environment that monitor user interactions with various items in the environment. In some alternate embodiments of the system 300, the transaction module 320 and/or the assistance module 325 may be partially or fully implemented in the computing device 345. For example, the system 300 may be implemented as a touchless commerce system that does not include self-checkout terminals 305.

The mobile computing device 375 comprises one or more computer processors 380, a memory 385, a display 390, and an input device 395. Generally, the computer processor(s) 380 may be configured similarly to the computer processor(s) 310, the memory 385 may be configured similarly to the memory 315, the display 390 may be configured similarly to the display 330, and the input device 395 may be configured similarly to the one or more input device 335. In some alternate embodiments of the system 300, the transaction module 320 and/or the assistance module 325 may be partially or fully implemented in the mobile computing device 375. In this way, the user may use the mobile computing device 375 to perform various aspects of the self-checkout transaction. For example, the mobile computing device 375 may be used to scan items, request associate assistance, present payment for the self-checkout transaction, and so forth.

Figure 4:
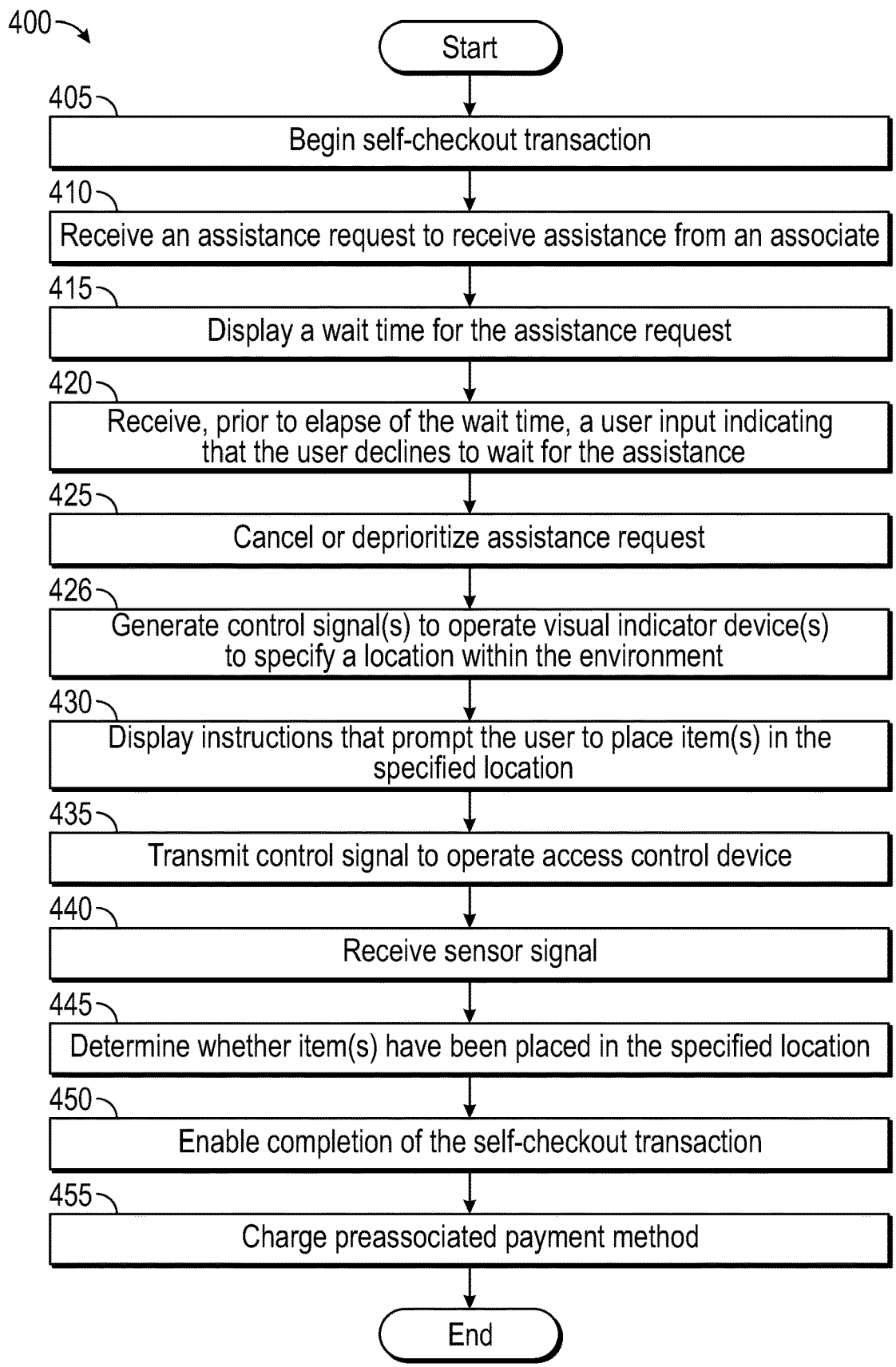
FIG. 4 is a method for a self-checkout transaction, according to one or more embodiments.

FIG. 4 is a method 400 for a self-checkout transaction, according to one or more embodiments. The method 400 may be used in conjunction with other embodiments. For example, the method 400 may be performed by the self-checkout terminal 305 of FIG. 3.

The method 400 begins at block 405, where a self-checkout transaction begins. In some embodiments, the self-checkout transaction begins as the user begins scanning items at the self-checkout terminal. In other embodiments, the self-checkout transaction begins while the user traverses the environment (e.g., as the user selects items).

At block 410, an assistance request is received that requests assistance from an associate. In some embodiments, the user provides an input to the self-checkout terminal to request the assistance. In some embodiments, the user provides an input to a mobile computing device to request the assistance.

Referring now to diagram 500 of FIG. 5A, a graphical user interface (GUI) 505 is displayed using, e.g., the self-checkout terminal or the mobile computing device of the user. Within the GUI 505, a virtual cart 510 including items 515-1, 515-2 presented by the user during the self-checkout transaction. As shown, item 515-1 is one (1) container of multivitamins (having a price of 3.00), and item 515-2 is one (1) six-pack of a sports drink (price 6.00). The item 515-2 is shown as an active item (e.g., using bold text or otherwise emphasized). In some embodiments, the item 515-2 is the active item responsive to user selection (pressing at a graphical element of the GUI 505) or due to being the most-recent item scanned during the self-checkout transaction.

The GUI 505 also includes a graphical element 520 (here, a "Need help?" button) that allows the user to request assistance, and a graphical element 525 (here, a "Finish & pay" button) that allows the user to complete the self-checkout transaction. As shown, the user has requested assistance by pressing at the graphical element 520 (indicated by the shading of the graphical element 520). The assistance request corresponds to requesting assistance for the active item (here, the item 515-2).

At block 415, a wait time is displayed for the assistance request. In some embodiments, an assistance module assigns an associate to fulfill the assistance request and estimates the wait time based on the assigned associate. In some embodiments, estimating the wait time is further based on one or more of: the availability of the associates, a number of assistance requests in the queue, a relative priority of the assistance requests, or the relative experience levels of the associates. The wait time may be displayed using the self-checkout terminal and/or the mobile computing device.

At block 420, prior to elapse of the wait time, a user input is received indicating that the user declines to wait for the assistance. The user input may be received using the self-checkout terminal and/or the mobile computing device. At block 425, the assistance request is canceled or deprioritized responsive to the user input.

Referring now to diagram 530 of FIG. 5B, the GUI 505 includes a pop-up window 535 that includes an estimated wait time 540 (here, "2:15") for fulfilling the assistance request, a graphical element 545 (here, a "Continue waiting" button), and a graphical element 550 (here, a "I don't want to wait" button). As shown, the user has declined to wait for the assistance by pressing at the graphical element 550 (indicated by the shading of the graphical element 550).

At block 426, one or more control signals are generated to operate one or more visual indication devices to specify a location within the environment. At block 430, instructions are displayed that prompt the user to place item(s) in the specified location. The instructions may be displayed using the self-checkout terminal and/or the mobile computing device. The location may be predetermined or may be determined responsive to the user input at block 420.

At block 435, a control signal is transmitted to operate an access control device. For example, operating the access control device may unlock, unlatch, or otherwise open a door. In other embodiments, control signal(s) may be transmitted to indicate the specified location, e.g., illuminating indicator light(s), activating a conveyor belt, or opening a locker door.

Referring now to diagram 555 of FIG. 5C, the GUI 505 includes a pop-up window 560 that instructs the user to place the item 515-2 at a specified location 565 (here, into locker #4). The pop-up window 560 also includes a graphical element 570 allowing the user to indicate that the item 515-2 has been placed as instructed (here, a "Done" button), and a graphical element 575 that allows the user to modify or cancel the assistance request (here, a "Back" button). As shown, the user has asserted the item 515-2 has been placed at the specified location 565 by pressing at the graphical element 570 (indicated by the shading of the graphical element 570).

At block 440, a sensor signal is received. In some embodiments, the sensor signal is received from a visual sensor or a weight sensor, which may be implemented in or external to the self-checkout terminal. At block 445, the assistance module determines whether item(s) have been placed in the specified location. In some embodiments, the item(s) correspond specifically to the assistance request.

At block 450, the assistance module enables completion of the self-checkout transaction. In some embodiments, the assistance module communicates with a transaction module to remove the item(s) from a virtual cart associated with the self-checkout transaction. In some embodiments, the assistance module sets or clears a flag to enable completion of the self-checkout transaction. In diagram 580 of FIG. 5D, the GUI 505 displays the virtual cart 510 after the item 515-2 has been removed.

At block 455, the self-checkout system charges a payment method that is preassociated with the user (e.g., completing a credit card authorization or an online money transfer). In some embodiments, charging the preassociated payment method occurs after the user adds one or more other items. The method 400 ends following completion of the block 455.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system comprising:
a display;
a platform;
a visual indicator device;

a weight sensor assigned to the platform;
an input device;
a scanner operable to scan an item indicating a user's intent to purchase the item, wherein the item is moved to a first location after scanning;
one or more computer processors configured to perform an operation for a self-checkout transaction, the operation comprising:
  adding the item to the self-checkout transaction;
  displaying, on an interface of the display, the item added to a list;
  receiving an assistance request to receive assistance from an associate, the assistance request associated with the item;
  displaying, on the interface of the display, a wait time for the assistance request;
  receiving, prior to elapse of the wait time, user input indicating that the user declines to wait for the assistance;
  in response to the user declining to wait for the assistance, operating the visual indicator device to indicate that the item should be moved from the first location to the platform;
  displaying, on the interface of the display, instructions that prompt the user to move the item from the first location to the platform;
  comparing a weight detected by the weight sensor to a reference weight for the item;
  in response to determining that a difference between the weight and the reference weight for the item is within a threshold, determining that the item has been moved to the platform;
  removing the item from the self-checkout transaction; and
  displaying, on the interface of the display, an update removing the item from the list.

2. The system of claim 1, wherein one or more of: receiving the assistance request, displaying the wait time, receiving the user input, or displaying the instructions are at a terminal of a self-checkout station.

3. The system of claim 1, wherein the operation further comprises responsive to determining that the item has been moved to the platform, enabling completion of the self-checkout transaction.

4. The system of claim 1, wherein the item comprises a restricted item.

5. The system of claim 1, wherein the user input cancels or deprioritizes the assistance request.

6. A checkout terminal comprising:
a display;
a locker comprising a door;
a weight sensor assigned to the locker;
a visual indicator device;
an input device;
a scanner operable to scan an item indicating a user's intent to purchase the item, wherein the item is moved to a first location after scanning;
one or more computer processors configured to perform an operation for a self-checkout transaction, the operation comprising:
  adding the item to a self-checkout transaction;
  displaying, on an interface of the display, the item added to a list;
  receiving an assistance request to receive assistance from an associate, the assistance request associated with the item;
  displaying, on the interface of the display, a wait time for the assistance request;
  receiving, using the input device and prior to elapse of the wait time, user input indicating that the user declines to wait for the assistance;
  in response to the user declining to wait for the assistance, operating the visual indicator device to indicate that the item should be moved from the first location to the locker and unlocking the door of the locker;
  displaying, on the interface of the display and responsive to user input, instructions that prompt the user to move the item from the first location to the locker;
  comparing a weight detected by the weight sensor to a reference weight for the item;
  in response to determining that a difference between the weight and the reference weight for the item is within a threshold, determining that the item has been moved to the locker;
  removing the item from the self-checkout transaction; and
  displaying, on the interface of the display, an update removing the item from the list.

7. The checkout terminal of claim 6, wherein one or more of: the display, the input device, and the one or more computer processors are included in a terminal of a self-checkout station.

8. The checkout terminal of claim 6, the operation further comprising responsive to determining that the item has been moved to the locker, enabling completion of the self-checkout transaction.

9. The checkout terminal of claim 6, wherein the item comprises a restricted item.

10. The checkout terminal of claim 9, wherein the locker is secured by an access control device, and wherein the access control device provides at least one of the visual indicator device.

11. The checkout terminal of claim 6, wherein the user input cancels or deprioritizes the assistance request.

12. A system comprising:
a display;
a conveyer system;
a visual indicator device;
a weight sensor assigned to the conveyer system;
an input device;
a scanner operable to scan an item indicating a user's intent to purchase the item, wherein the item is moved to a first location after scanning;
one or more computer processors configured to perform an operation for a self-checkout transaction, the operation comprising:
  adding the item to the self-checkout transaction;
  displaying, on an interface of the display, the item added to a list;
  receiving, from a user, an assistance request to receive assistance from an associate, the assistance request associated with the item;
  displaying, on the interface of the display, a wait time for the assistance request;
  prior to elapse of the wait time, receiving, using the input device, user input indicating that the user declines to wait for the assistance;
  in response to the user declining to wait for the assistance, operating the visual indicator device to indicate that the item should be moved from the first location to the conveyer system;

displaying, on the interface of the display and responsive to the user input, instructions that prompt the user to move the item from the first location to the conveyer system;

comparing a weight detected by the weight sensor to a reference weight for the item;

in response to determining that a difference between the weight and the reference weight for the item is within a threshold, determining that the item has been moved to the conveyer system such that the conveyer system conveys the item away from the scanner;

removing the item from the self-checkout transaction; and displaying, on the interface of the display, an update removing the item from the list.

13. The system of claim 12, the operation further comprising responsive to determining the item has been moved to the conveyer system, enabling completion of the self-checkout transaction.

14. The system of claim 12, wherein the item comprises a restricted item.

15. The system of claim 12, wherein the user input cancels or deprioritizes the assistance request.

\* \* \* \* \*